United States Patent
Choi et al.

(10) Patent No.: US 9,684,100 B2
(45) Date of Patent: Jun. 20, 2017

(54) ANTI-REFLECTION NANO-COATING STRUCTURE

(71) Applicant: KOREA INSTITUTE OF SCIENCE AND TECHNOLOGY, Seoul (KR)

(72) Inventors: Won Kook Choi, Seoul (KR); Dong Hee Park, Seoul (KR); Chang Hwan Wie, Seoul (KR); Do Kyung Hwang, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 14/825,881

(22) Filed: Aug. 13, 2015

(65) Prior Publication Data

US 2016/0054476 A1 Feb. 25, 2016

(30) Foreign Application Priority Data

Aug. 20, 2014 (KR) .................. 10-2014-0108454

(51) Int. Cl.
*G02B 1/115* (2015.01)
*G02B 1/118* (2015.01)

(52) U.S. Cl.
CPC .............. *G02B 1/115* (2013.01); *G02B 1/118* (2013.01); *Y10T 428/24413* (2015.01)

(58) Field of Classification Search
CPC ................... G02B 1/115; Y10T 428/24413
USPC ........................................ 428/141, 148, 149
See application file for complete search history.

(56) References Cited

U.S. PATENT DOCUMENTS

| | | | | |
|---|---|---|---|---|
| 8,557,341 B2 * | 10/2013 | Yang | ..................... | B82Y 10/00 427/256 |
| 9,291,748 B2 | 3/2016 | Momoki et al. | | |
| 2011/0019277 A1 | 1/2011 | Sager et al. | | |
| 2011/0120554 A1 * | 5/2011 | Chhajed | .................. | C09D 1/00 136/259 |
| 2012/0164415 A1 * | 6/2012 | Otani | ..................... | C03C 17/34 428/212 |
| 2013/0108832 A1 | 5/2013 | Domercq et al. | | |
| 2014/0127850 A1 * | 5/2014 | Yuan | ................. | H01L 31/02327 438/72 |

(Continued)

FOREIGN PATENT DOCUMENTS

| | | |
|---|---|---|
| JP | 2011-505267 A | 2/2011 |
| JP | 2011-215440 A | 10/2011 |

OTHER PUBLICATIONS

J.-Q. Xi et al., Optical thin-film materials with low refractive index for broadband elimination of Fresnel reflection, Naturephotonics, Mar. 1, 2007, pp. 176-179, vol. 1, Letters, Nature Publishing Group, USA.

(Continued)

*Primary Examiner* — Nathan Van Sell
(74) *Attorney, Agent, or Firm* — Goldilocks ZONE IP LAW

(57) ABSTRACT

Provided are an anti-reflection nano-coating structure and a method of manufacturing the same. The anti-reflection nano-coating structure has low dependency on incident light. The anti-reflection nano-coating structure has a normal-align nano-structure on the entire surface of the substrate regardless of curvature of the substrate by controlling a ratio of reactive gas during sputtering.

11 Claims, 11 Drawing Sheets

(56) References Cited

U.S. PATENT DOCUMENTS

2014/0170308 A1* 6/2014 Kalyankar ............ G02B 1/115
427/162

OTHER PUBLICATIONS

Krause, et al., Pore analysis of obliquely deposited nanostructures by krypton gas adsorption at 87K, Microporous and Mesoporous Materials, Feb. 28, 2011, pp. 166-173, vol. 143, Elsevier.
A Communication issued on Jul. 6, 2015 from Korean Intellectual Property Office in a counterpart Korean application No. 10-2014-0108454.
Communication from the Japanese Intellectual Property Office dated Feb. 28, 2017, in a counterpart Japanease Patent Application No. 2015-162530.

* cited by examiner

ANTI-REFLECTION NANO-COATING STRUCTURE

RELATED APPLICATION

This application claims the benefit of Korean Patent Application No. 10-2014-0108454, filed on Aug. 20, 2014, in the Korean Intellectual Property Office, the disclosure of which is incorporated herein in its entirety by reference.

BACKGROUND

1. Field

Embodiments relate to an anti-reflection nano-coating structure, and in particular, to an anti-reflection nano-coating structure that has a low reflectance regardless of an incident angle of light and a method of manufacturing the same.

2. Description of the Related Art

To remove a ghost phenomenon (see FIG. 1) or flare phenomenon (see FIG. 2) from a captured image or picture that occurs due to reflection on the surface of optical components, optical components are subjected to a low-reflection coating process to reduce reflectance. To this end, multi-layer thin film structure coating techniques in which a low refractive index material and a high refractive index are alternately stacked on each other are used. However, when these techniques are used, reflectance rapidly increases at an incident angle of 60° or more. The rapid increase in reflectance is addressed by forming a nano-structure on the surface of optical components to reduce reflectance even at high incident angle.

Nano-structure formation techniques of the related art include a hydrothermal process, a sol-gel process, and a lithography process. However, these processes require a plurality of steps, leading to high manufacturing costs. In addition, in the case of the hydrothermal process and the sol-gel process, due to the characteristic of a wet-coating process that nanoparticles dissolved in a liquid is used for coating, it is difficult to homogeneously form a nano-structure on a substrate having a curved surface. In the case of the lithography process, when a substrate used has a curved surface, not a flat surface, it is difficult to form a nano-structure that vertically extends on a substrate.

SUMMARY

Provided is an anti-reflection nano-coating structure that has low reflectance regardless of an incident angle of light.

Provided is a method of manufacturing the anti-reflection nano-coating structure.

Additional aspects will be set forth in part in the description which follows and, in part, will be apparent from the description, or may be learned by practice of the presented exemplary embodiments.

An aspect of the inventive concept provides an anti-reflection nano-coating structure including:

a substrate that is flat or curved;

a first coating layer that includes a first oxide nanoparticle having a refractive index lower than that of the substrate and is disposed on the substrate;

a second coating layer that includes tapered nano-fillers including a titanium dioxide nanoparticle and is disposed on the first coating layer, wherein the tapered nano-fillers are aligned normally to the first coating layer; and a third coating layer that includes a second oxide nanoparticle having a refractive index lower than that of the substrate and is disposed on an end of each of the tapered nano-fillers.

Another aspect of the inventive concept provides a method of manufacturing an anti-reflection nano-coating structure including depositing a first oxide nanoparticle having a refractive index lower than that of the substrate on a substrate to form a first coating layer, wherein the substrate is flat or curved;

depositing a titanium dioxide nanoparticle on the first coating layer by sputtering in the presence of a mixed gas including inert gas and reactive gas including carbon monoxide and oxygen to normal-grow a tapered nano-filler; and depositing a second oxide nanoparticle having a refractive index lower than that of the substrate on an end of the tapered nano-filler.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
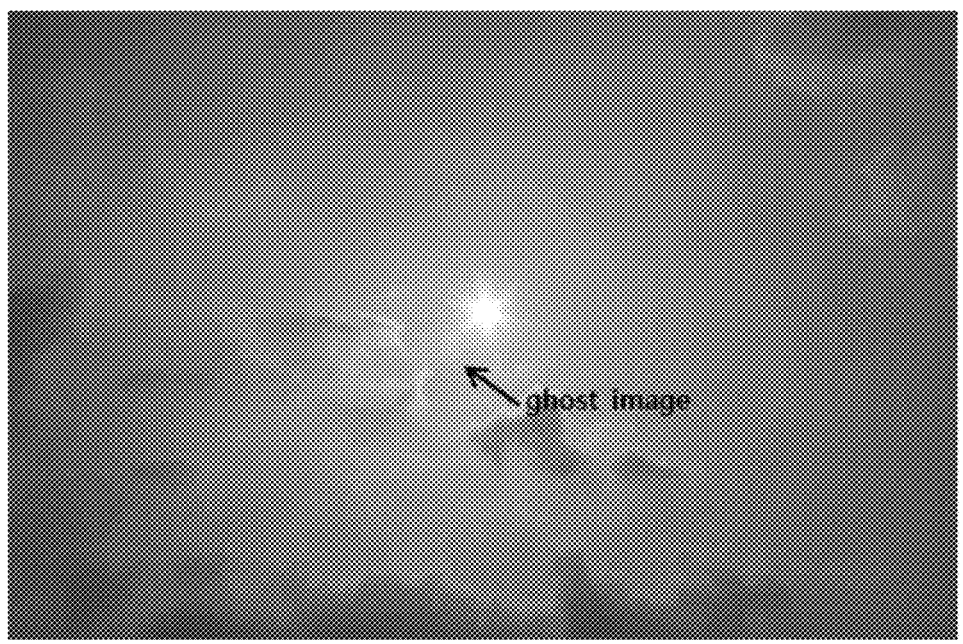
FIG. 1 shows an image obtained by using a commercially available digital single-lens reflex (DSLR) bundle lens, the image showing a flare phenomenon around the sun and a ghost image indicated as a red spot.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects.

Hereinafter, with reference to the attached drawings, an anti-reflection nano-coating structure according to exemplary embodiments and a method of manufacturing the same according to exemplary embodiments will be described in detail.

An anti-reflection nano-coating structure according to an exemplary embodiment includes a substrate that is flat or curved;

a first coating layer that includes a first oxide nanoparticle having a refractive index lower than that of the substrate and is disposed on the substrate;

a second coating layer that includes tapered nano-fillers including a titanium dioxide nanoparticle and is disposed on the first coating layer, wherein the tapered nano-fillers are aligned normally to the first coating layer; and a third coating layer that includes a second oxide nanoparticle having a refractive index lower than that of the substrate and is disposed on an end of each of the tapered nano-fillers.

Figure 3:
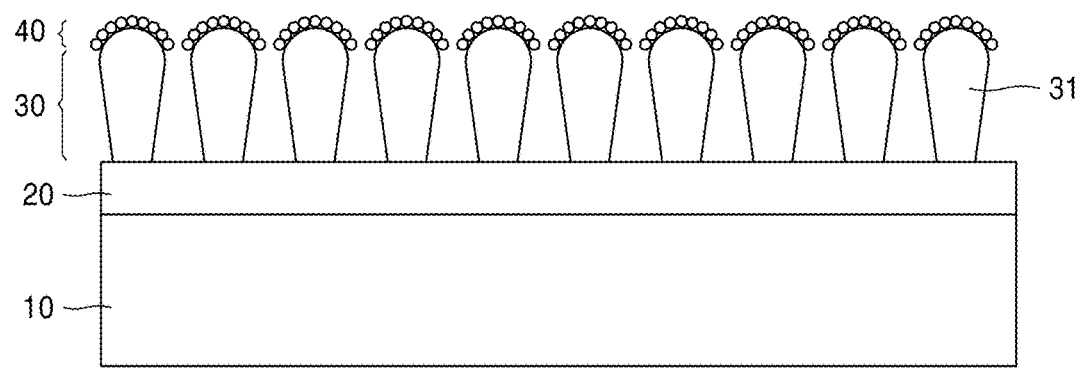
FIG. 3 is a schematic sectional-view of an anti-reflection nano-coating structure according to an exemplary embodiment.

FIG. 3 is a schematic sectional-view of an anti-reflection nano-coating structure according to an exemplary embodiment.

Referring to FIG. 3, the anti-reflection nano-coating structure includes a first coating layer 20 including a first oxide nanoparticle disposed on a substrate 10, and a second coating layer 30 including a tapered nano-filler 31 having a titanium dioxide nanoparticle disposed on the first coating layer 20.

On the second coating layer 30, a third coating layer 40 including a second oxide nanoparticle is disposed. The second oxide nanoparticle disposed on an end of the tapered nano-filler 31 may be discontinuous.

The substrate 10 may have a flat or curved shape, and a curvature of the substrate 10 is not particularly limited. For example, the curvature of the substrate 10 may satisfy the condition R<50. Within the curvature range, an anti-reflection nano-coating structure having an anti-reflection nano-coating that hardly depends on the incident angle of light may be embodied on the substrate 10.

The substrate 10 may be a glass substrate, a polymer substrate, a ceramic substrate, or a combination of these. The polymer substrate may include at least one selected from an ultraviolet (UV) curable polymer, a thermally curable polymer, and a ceramic. For example, the polymer substrate may include polycarbonate (PC), poly ethylene terephthalate (PET), poly ethylene naphthalate (PEN), poly ether sulfone (PES), or a combination thereof.

The substrate 10 may have a refractive index (n) of, for example, 1.4 to 2.0. For example, even with respect to a substrate having a high refractive index of 1.7 or more, an anti-reflection nano-coating may be embodied. This embodiment will be presented in Examples below.

On the substrate 10, the first coating layer 20 formed by depositing a first oxide nanoparticle having a lower low refractive index than that of the substrate 10 is disposed. The first oxide nanoparticle having a lower low refractive index than that of the substrate 10 offsets a difference between a refractive index of the substrate 10 and a refractive index of an air layer, reducing reflectance.

The first oxide nanoparticle may include, for example, silicon dioxide, silicon nitride dioxide, silicon carbide dioxide, or a combination oxide of these. When a glass substrate having a refractive index of 1.5 or a substrate having a refractive index of higher than 1.5 is used as the substrate 10, a material having a refractive index of less than 1.5, for example, silicon dioxide (n=1.4) may be used to form the first coating layer 20.

A thickness of the first coating layer 20 may be in a range of 5 to 300 nm, and for example, may be in a range of 10 to 100 nm. Within the thickness range, satisfactory optical characteristics may be obtained while transmissivity is maintained.

Figure 10:
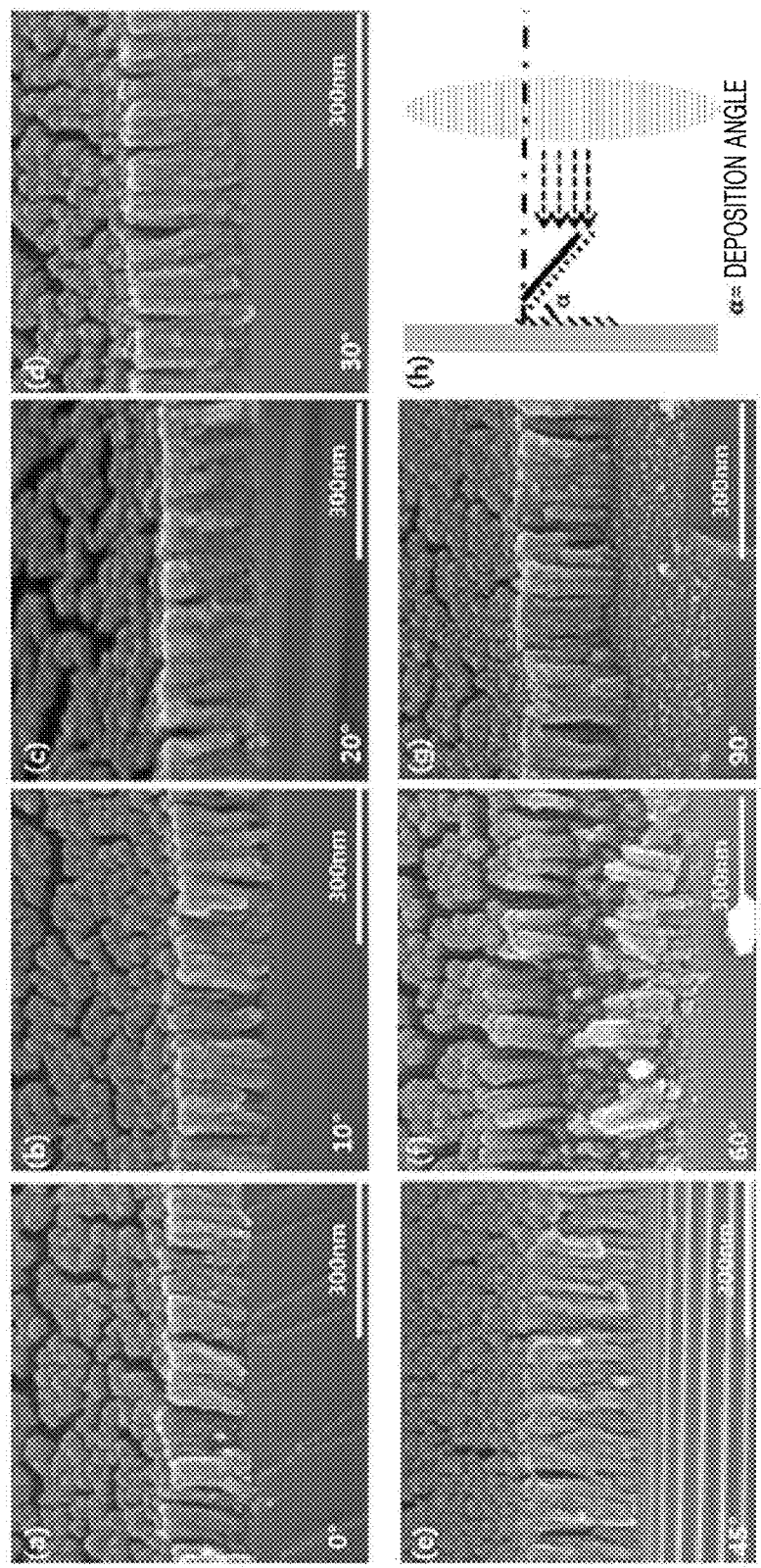
FIG. 10 shows a SEM image of a nano-structure of a $TiO_2$ layer depending on a deposition angle (a) of a flat glass in Example 2.

On the first coating layer 20, tapered nano-fillers 31 having a titanium dioxide nanoparticle are normal-aligned to form the second coating layer 30. That is, tapered nano-fillers 31 are arranged on the substrate 10, and long axes of said tapered nano-fillers 31 are aligned perpendicular to (i.e., aligned normal to) the surface of the substrate 10. For example, each of the tapered nano-fillers 31 is aligned normal to a portion of the surface of the substrate 10 having direct contact with the tapered nano-filler regardless of where the tapered nano-filler is located. The second coating layer 30 may be formed by growing titanium dioxide nanoparticles on the substrate 10 such that each titanium dioxide nanoparticle grows in a direction perpendicular to (i.e., a direction normal to) the entire surface of the substrate 10 regardless of the curvature of the substrate 10 by sputtering a reactive gas. For example, as shown in FIG. 10, nano-fillers are self-aligned normal to the entire surface of a curved substrate.

The tapered nano-filler 31 may be smaller than a wavelength range of visible light. The tapered nano-filler 31 may have a height of 50 nm to 200 nm, for example, 80 to 150 nm, and an average diameter of 10 nm to 50 nm, for example, 20 to 50 nm. The tapered nano-filler 31 may have an aspect ratio (i.e., a ratio of an average diameter to average height) of 1:1 to 1:20.

The tapered nano-filler 31 may include a titanium dioxide nanoparticle, and be smaller than a wavelength of incident light. Accordingly, light is irradiated toward the tapered nano-filler 31 and is subsequently incident on the surface of the tapered nano-filler 31, a wavelength of the incident light causes specular reflection or diffuse reflection, and thus, resulting in destructive interference between incident light and light having a wavelength having an opposite phase difference. Accordingly, anti-reflection characteristics may be obtained.

The tapered nano-filler 31 may have a tapered structure, and may have a reducing diameter in a direction from an upper portion to a lower portion thereof, that is, towards the first coating layer 20. Since the first coating layer 20 includes the first oxide nanoparticle, a surface of the first coating layer 20 may have surface defects and not be atomically flat. The titanium dioxide nanoparticle may be initially deposited on the surface of the first coating layer 20 and grown into an island, and while the deposition of titanium dioxide nanoparticles continues, a thickness of a layer of titanium dioxide nanoparticles increases, thereby forming the tapered nano-filler 31 having a tapered structure.

An end of the lower portion of the tapered nano-filler 31 may have a diameter of, for example, 50 to 90% with respect to a half of the height of the tapered nano-filler 31.

The second coating layer 30 including the tapered nano-filler 31 has voids between the tapered nano-fillers 31. Accordingly, the second coating layer 30 may have a void structure that provides an air layer. Accordingly, a refractive index (n) of the second coating layer 30 may be controlled between an refractive index (n=1) of air and an refractive index ($n_o$) of the tapered nano-filler 31, bulk material itself: $1<n<n_o$.

The tapered nano-filler 31 may further include, in addition to titanium dioxide, elements of Groups IV and V. The elements of Groups IV and V may have a reduced band gap by substitution with oxygen or titanium (Ti). The elements of Groups IV and V may include, for example, at least one selected from C, N, Si, Ge, Sn, Pb, N, P, As, Sb, and Bi. For example, the elements of Groups IV and V may include C, N, or the like. An amount of the elements of Groups IV and V may be 25 parts by weight or less based on 100 parts by weight of the titanium dioxide. When the amount of the elements of Groups IV and V is too high, a second phase may be formed. The elements of Groups IV and V may be included in the tapered nano-filler 31 by providing gas containing these elements during a sputtering process.

The third coating layer 40 including a second oxide nanoparticle is disposed on the second coating layer 30. Since the second coating layer 30 has the porous nano-structure of the tapered nano-filler 31, the surface of the second coating layer 30 is discontinuous. Accordingly, since the second oxide nanoparticle is deposited on an end of the tapered nano-filler 31, the third coating layer 40 formed on the second coating layer 30 is also discontinuous.

The third coating layer 40 is formed by using the second oxide nanoparticle that has a lower refractive index than that of the substrate 10 and also a lower refractive index than that of the titanium dioxide. Accordingly, a difference between the refractive index of the second coating layer 30 and the refractive index of the air layer may be offset, thereby reducing reflectance.

The second oxide nanoparticle may include, for example, silicon dioxide, silicon nitride dioxide, silicon carbide dioxide, or a combination oxide thereof. The second oxide nanoparticle may include the same component as or a different component from the first oxide nanoparticle. The second oxide nanoparticle may be, for example, a nanoparticles including silicon dioxide (n=1.4).

A thickness of the third coating layer 40 may be in a range of 1 to 100 nm, and for example, 5 to 50 nm. Within the thickness range, satisfactory optical characteristics may be obtained while transmissivity is maintained.

In some embodiments, a buffer layer (not shown) may be further included between the substrate 10 and the first coating layer 20. The buffer layer may be used to reduce the difference between the refractive index of the substrate 10 and the refractive index of the air layer, when the substrate 10 has a high refractive index, for example, a refractive index of 1.7 or more. The buffer layer may include a material that has a refractive index that is between the refractive index of the substrate 10 and the refractive index of the first coating layer 20. For example, the buffer layer may include aluminum oxide.

In some embodiments, the anti-reflection nano-coating structure may have excellent anti-reflection characteristics. For example, an average reflectance of the anti-reflection nano-coating structure in a wavelength of 380 nm to 780 nm at an incident angle of 0° to 50° may be less than 0.8%. In some embodiments, an average reflectance of the anti-reflection nano-coating structure in a wavelength of 380 nm to 780 nm at an incident angle of 60° to 80° may be less than 12%. Even when the incident angle of light is 60° or more, the anti-reflection nano-coating structure has a low reflectance. Accordingly, the anti-reflection nano-coating structure retains suitable anti-reflection characteristics even with respect to a substrate having curvature.

As described above, the anti-reflection nano-coating structure has a very low dependency on an incident angle of light regardless of the curvature of a substrate. The anti-reflection nano-coating structure may be used to manufacture a camera lens having various curvatures to provide an anti-reflection coating lens with high efficiency. When such a lens is used, the occurrence of a ghost image or flare phenomenon appearing on a captured image or picture may be effectively reduced.

Hereinafter, a method of manufacturing the anti-reflection nano-coating structure according to embodiments will be described in detail.

A method of manufacturing an anti-reflection nano-coating structure according to an exemplary embodiment includes depositing a first oxide nanoparticle having a refractive index lower than that of the substrate on a substrate to form a first coating layer, wherein the substrate is flat or curved;

depositing a titanium dioxide nanoparticle on the first coating layer by sputtering in the presence of a mixed gas including inert gas and reactive gas including carbon monoxide and oxygen to normal-grow a tapered nano-filler; and depositing a second oxide nanoparticles having a refractive index lower than that of the substrate on an end of the tapered nano-filler.

The substrate is the same as described above.

Figure 4:
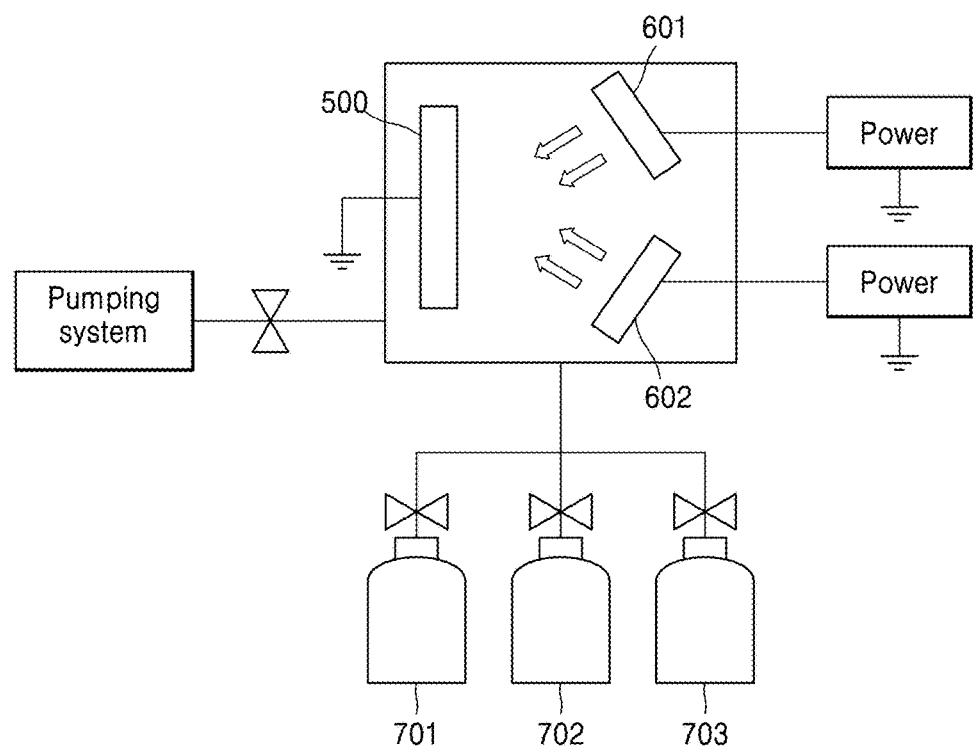
FIG. 4 is a conceptual view of an example of a sputtering apparatus used to manufacture an anti-reflection nano-coating structure according to an exemplary embodiment.

To deposit layers that constitute the anti-reflection nano-coating structure, for example, a sputtering apparatus illustrated in FIG. 4 may be used.

Referring to FIG. 4, conventionally, the sputtering apparatus may include a titanium sputtering target 602, a silicon sputtering target 601, a power supplier configured to apply energy to a target, and a mounting element 500 on which a substrate, on which a material sputtered from a sputtering target is deposited, is to be mounted.

Depositing of the first oxide nanoparticle, the titanium dioxide nanoparticle, and the second oxide nanoparticle may be performed at a temperature from room temperature to 80° C.

First, to deposit a first coating layer including a first oxide nanoparticle, for example, a silicon dioxide nanoparticle on a substrate, argon gas 701 and oxygen gas 703, which enable formation of plasma, are provided, and then, a voltage is applied to the silicon sputtering target 601 to deposit silicon dioxide.

Then, to deposit a titanium dioxide nanoparticle on the first coating layer to grow a tapered nano-filler normally, argon gas 701, carbon monoxide gas 702, and oxygen gas 703, which enable formation of plasma, are provided, and then, a voltage is applied to the titanium sputtering target 602 to deposit the titanium dioxide nanoparticle and to grow a tapered nano-filler normally.

Herein, the argon gas 701 used as sputter gas is inert gas, and accordingly, does not affect the growth of a nano-structure of $TiO_2$. A titanium particle sputtered by the titanium sputtering target 602 chemically reacts with reactive gas including oxygen and carbon monoxide to form a titanium dioxide nanoparticle. The titanium dioxide nanoparticle is deposited on the substrate to grow into a self-align nano-filler structure.

The reaction of a sputtered titanium metal element and reactive gas may occur according to the Hess's law as below.

(Reaction Scheme 1)

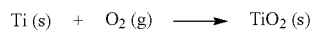

$$Ti\,(s) + O_2\,(g) \longrightarrow TiO_2\,(s)$$

(Reaction Scheme 2)

$$Ti\,(s) + 2CO\,(g) \longrightarrow TiO_2\,(s) + 2C\,(s)$$

(Reaction Scheme 3)

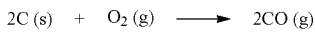

$$2C\,(s) + O_2\,(g) \longrightarrow 2CO\,(g)$$

According to Reaction Scheme 1, a titanium metal element reacts with oxygen gas to produce titanium dioxide; according to Reaction Scheme 2, a titanium metal element reacts with carbon monoxide gas to produce titanium dioxide, and the carbon is reduced; and according to Reaction Scheme 3, the reduced carbon reacts with oxygen gas to produce carbon monoxide.

When the sputtering reaction is performed at room temperature, the formation of titanium dioxide through the reactions of titanium metal with carbon monoxide gas and oxygen gas can be explained by using the Gibbs free energy) ($\Delta G^0$) at room temperature as reaction energy for each of Reaction Schemes 1, 2, and 3.

In some embodiments, a volume ratio of carbon monoxide to oxygen in the reactive gas may be greater than 100:0 and less than 90:10. For example, the volume ratio may be 99.9:0.1 or more and 95:5 or less. For example, based on 100 of a total volume of carbon monoxide and oxygen, a volume of carbon monoxide may be greater than 90 and less than 100, and a volume of oxygen may be greater than 0 and less than 10. For example, based on 100 of a total volume of carbon monoxide and oxygen, a volume of carbon monoxide may be in a range of about 95 to about 99.9, and a volume of oxygen may be in a range of about 0.1 to about 5.

As described above, since carbon monoxide is provided in an amount dozens of times greater than oxygen, a larger amount of titanium dioxide may be generated according to Reaction Scheme 1 than according to Reaction Scheme 1. The carbon reduced according to Reaction Scheme 2 is combined with oxygen according to Reaction Scheme 3 to produce carbon monoxide, and then titanium dioxide is produced according to Reaction Scheme 2. Through these reactions, normal-growth (i.e., growth in a direction perpendicular to the surface of the substrate) of tapered nano-fillers occurs more than horizontal growth, and accordingly, regardless of curvature of a substrate, a nano-filler structure may be aligned normally to the substrate.

Figure 5:
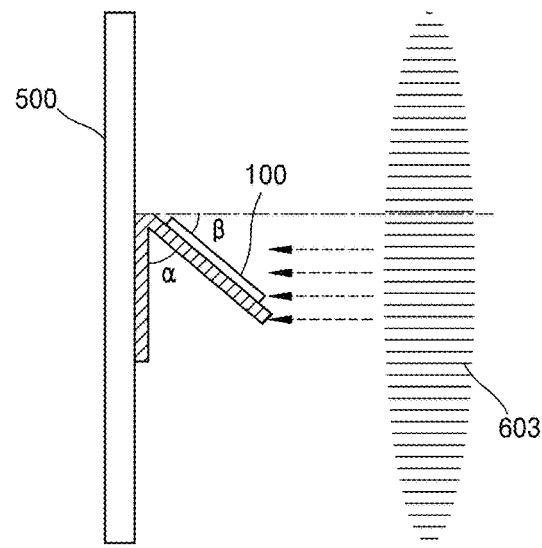
FIG. 5 is a view to explain a case in which when a flat substrate is used, an incident angle of plasma is controllable by adjusting a deposition angle.

As illustrated in FIG. 5, in the case of a flat substrate 100, an incident angle ($\beta$) of a plasma 603 generated from the titanium sputtering target 602 with respect to the flat substrate 100 may be controlled to be in a range of 0° to 90° by adjusting a deposition angle ($\alpha$) between the flat substrate 100 and the mounting element 500 to be in a range of 0° to 90°. The deposition angle ($\alpha$) and the incident angle ($\beta$) have the relationship of $\alpha=90°-\beta$ as illustrated in FIG. 5.

Figure 6:
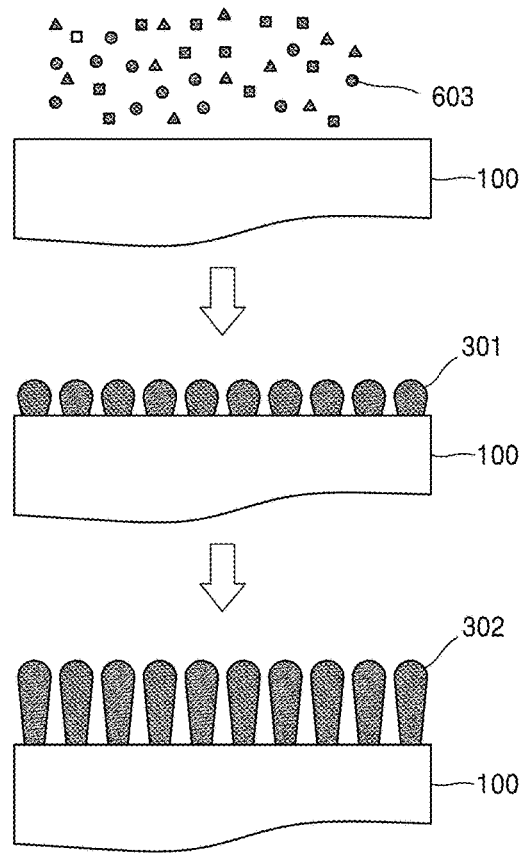
FIG. 6 is a view illustrating a formation process of a nano-filler that is grown normally to a flat substrate.

Referring to FIG. 6, target particles and reactive gases present in the plasma 603 reacts with each other to produce titanium dioxide nanoparticles, which then reach the flat substrate 100 to initially grow into an island 301. On the initially grown island 301, the normal-growth more quickly occurs than a horizontal growth, thereby causing a normal self-align growth. Accordingly, regardless of the deposition angle ($\alpha$) of the flat substrate 100 and incident angle ($\beta$) of plasma, a nano-filler 302 that is aligned normally to the entire surface of the flat substrate 100 may be formed.

Figure 7:
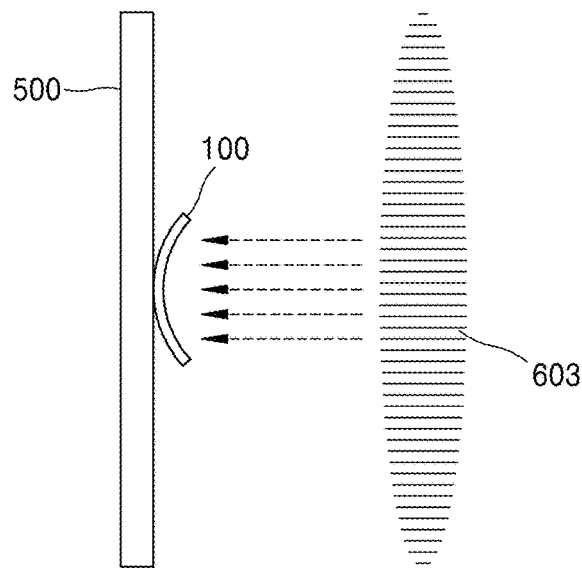
FIG. 7 is a view to explain an incident angle of plasma on a curved substrate.
Figure 8:
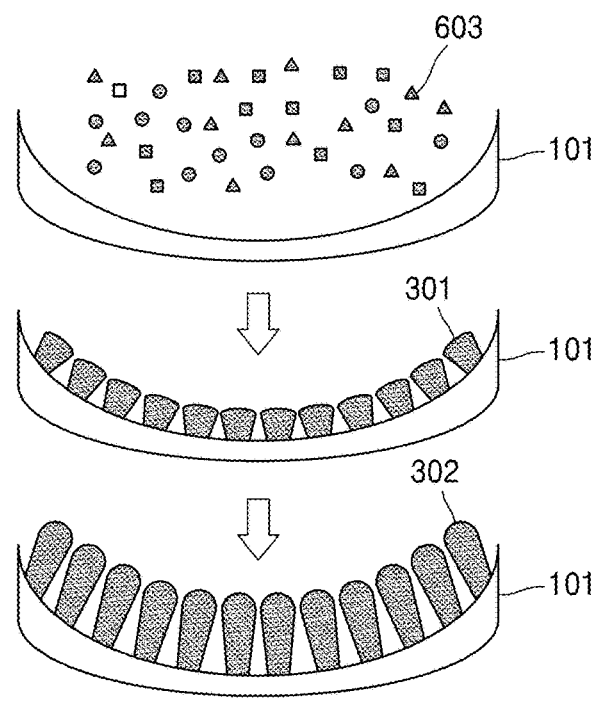
FIG. 8 is a view illustrating a formation process of a nano-filler that is grown normally to a curved substrate regardless of curvature of the curved substrate.

Since regardless of a deposition angle of a substrate, a nano-filler is grown normally to the entire surface of the substrate, as illustrated in FIGS. 7 and 8, even when a curved substrate 101 is used, regardless of the curvature of the curved substrate 101, a nano-filler 302 that is aligned normally to the entire surface of the curved substrate 101 may be formed substrate 101.

Layers that constitute the anti-reflection nano-coating structure may be deposited by using, for example, the sputtering apparatus illustrated in FIG. 4.

Once the nano-filler is formed, the argon gas 701 and the oxygen gas 702, which enable formation of plasma, are provided to deposit the second oxide nanoparticle thereon. Then, a voltage is applied to the silicon sputtering target 601 to deposit silicon dioxide.

In some embodiments, before a first coating layer is formed on a substrate, a buffer layer may be formed on the substrate. Descriptions of the buffer layer are the same as described above. The buffer layer may be formed by atomic layer deposition (ALD), or sputtering deposition.

Exemplary embodiments will be described in detail with reference to Examples. However, Examples are presented herein only to exemplify the technical concept and do not limit the scope of the inventive concept.

Example 1

$TiO_2$ Deposition Depending on Reactive Gas Combination Ratio

A glass substrate that had been washed was mounted on a mounting element, and, a base pressure of a sputtering apparatus equipped with a silicon sputtering target having a width of 40 cm was lowered to $5\times10^{-6}$ Torr by using a vacuum pump, and then, a ratio of argon (Ar) to oxygen ($O_2$) was adjusted to be 100 sccm:100 sccm to increase the pressure in a chamber up to $10^{-3}$ Torr. At room temperature, a voltage was applied to the silicon sputtering target at an electric power of 1.5 kW to generate plasma. A $SiO_2$ layer having a thickness of about 65 nm was deposited on the glass substrate.

Then, to deposit a $TiO_2$ layer on the resultant glass substrate with the $SiO_2$ layer formed thereon, a base pressure of a sputtering apparatus equipped with a titanium sputtering target having a width of 40 cm was lowered to $5\times10^{-6}$ Torr by using a vacuum pump, and then, a ratio of argon (Ar):carbon monoxide (CO):oxygen ($O_2$) was controlled to be from 100 sccm:100 sccm:0 sccm to 100 sccm:50 sccm:50 sccm, and the pressure in the chamber was fixed to $3\times10^{-3}$ Torr. Herein, since Ar gas used as sputter gas is inert gas and accordingly, does not affect the growth of a nano-structure of $TiO_2$, 100 sccm of Ar gas was commonly used in all experiments. A voltage was applied to the titanium sputtering target at an electric power of 1.5 kW to generate plasma. At room temperature, sputtering was performed to deposit the $TiO_2$ layer on the glass substrate with the $SiO_2$ layer deposited thereon.

Figure 9:
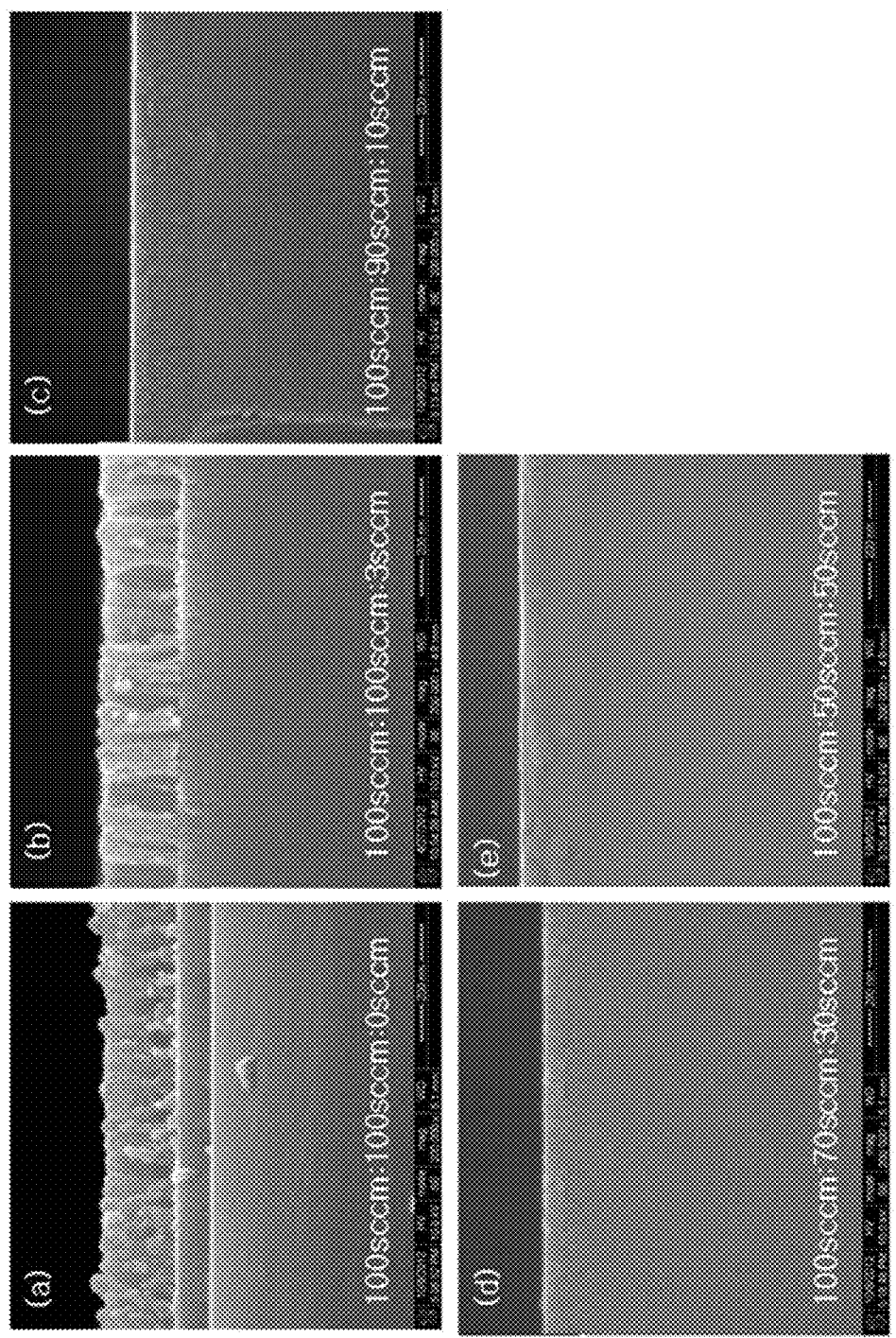
FIG. 9 shows a scanning electron microscope (SEM) image of a nano-structure of a $TiO_2$ layer depending on a reactive gas ratio in Example 1.

FIG. 9 shows SEM images of the $TiO_2$ layer at ratios of $Ar:CO:O_2$ gas of 100 sccm:100 sccm:0 sccm, 100 sccm:100 ccm:3 sccm, 100 sccm:90 sccm:10 sccm, 100 sccm:70 sccm:30 sccm, and 100 sccm:50 sccm:50 sccm.

Referring to FIG. 9, when a ratio of CO to $O_2$ gas is equal to or greater than 90 sccm:10 sccm, that is, a relative amount of $O_2$ gas increases and a relative amount of CO gas decreases, $TiO_2$ grows into a thin film, not a normal growth. Herein, CO gas and $O_2$ gas were reactive gas. From these results, it is confirmed that CO gas plays a critical role in allowing $TiO_2$ to grow normally. A gas ratio of CO to $O_2$ for the normal-growth of a nano-filler may be greater than 100 sccm:0 sccm and less than 90 sccm:10 sccm, and an optimal gas ratio was 100 sccm:3 sccm.

Example 2

Self-Align Growth Normal to Flat Glass Substrate Depending on Deposition Angle

To confirm that a $TiO_2$ layer grows into a self-align nano-structure normal to a substrate at various incident angles, sputtering was performed on a flat glass substrate as below.

A flat glass substrate which had been washed was attached to a substrate holder of which a deposition angle ($\alpha$) was controllable to be in a range of 0° to 90°, and then, mounted on a deposition unit. A deposition angle ($\alpha$) and an incident angle ($\beta$) had the relationship of $\alpha=90°-\beta$ as illustrated in FIG. 6. Then, a base pressure of a sputtering apparatus equipped with a titanium sputtering target having a width of 40 cm was lowered to $5\times10^{-6}$ Torr by using a vacuum pump, and then, a ratio of $Ar:CO:O_2$ was controlled to be 100 sccm:100 sccm:3 sccm, and the pressure in a chamber was fixed to $3\times10^{-3}$ Torr. A voltage was applied to the titanium sputtering target at an electric power of 1.5 kW to generate plasma. At room temperature, sputtering was performed to deposit a $TiO_2$ layer having a thickness of about 150 nm on the flat glass substrate with the $SiO_2$ layer deposited thereon.

FIG. 10 shows SEM images showing a nano-structure of the $TiO_2$ layer at various deposition angles ($\alpha$).

Referring to FIG. 10, it is confirmed that the $TiO_2$ layer formed by sputtering has a nano-structure vertically extending on the flat glass substrate regardless of a deposition angle. This is because $TiO_2$ nanoparticles produced by the reaction between a target particle in the state of plasma and reactive gas reach the flat glass substrate and initially grow into an island, and then, along the initially grown island, they grow normal to the flat glass substrate. Herein, although the target particle and reactive gas grow vertically and horizontally on the flat glass substrate, since a vertical growth rate is greater than a horizontal growth rate, they normal self-align grows, not thin-film grow.

Example 3

Self-Align Growth Normal to Curved Substrate

As a curved substrate, a plastic lens having curvature was mounted on a mounting element, and a base pressure of a sputtering apparatus equipped with a titanium sputtering target having a width of 40 cm was lowered to $5\times10^{-6}$ Torr by using a vacuum pump, and then, a ratio of $Ar:CO:O_2$ was controlled to be 100 sccm:100 sccm:3 sccm, and the pressure in a chamber was fixed to $3\times10^{-3}$ Torr. The pressure in the chamber was fixed to $3\times10^{-3}$ Torr. A voltage was applied to the titanium sputtering target at an electric power of 1.5 kW to generate plasma. At room temperature, sputtering was performed on the curved substrate at a deposition angle which was set to be 0° with respect to a central portion thereof to form a $TiO_2$ layer having a thickness of about 150 nm on the curved substrate.

Figure 11:
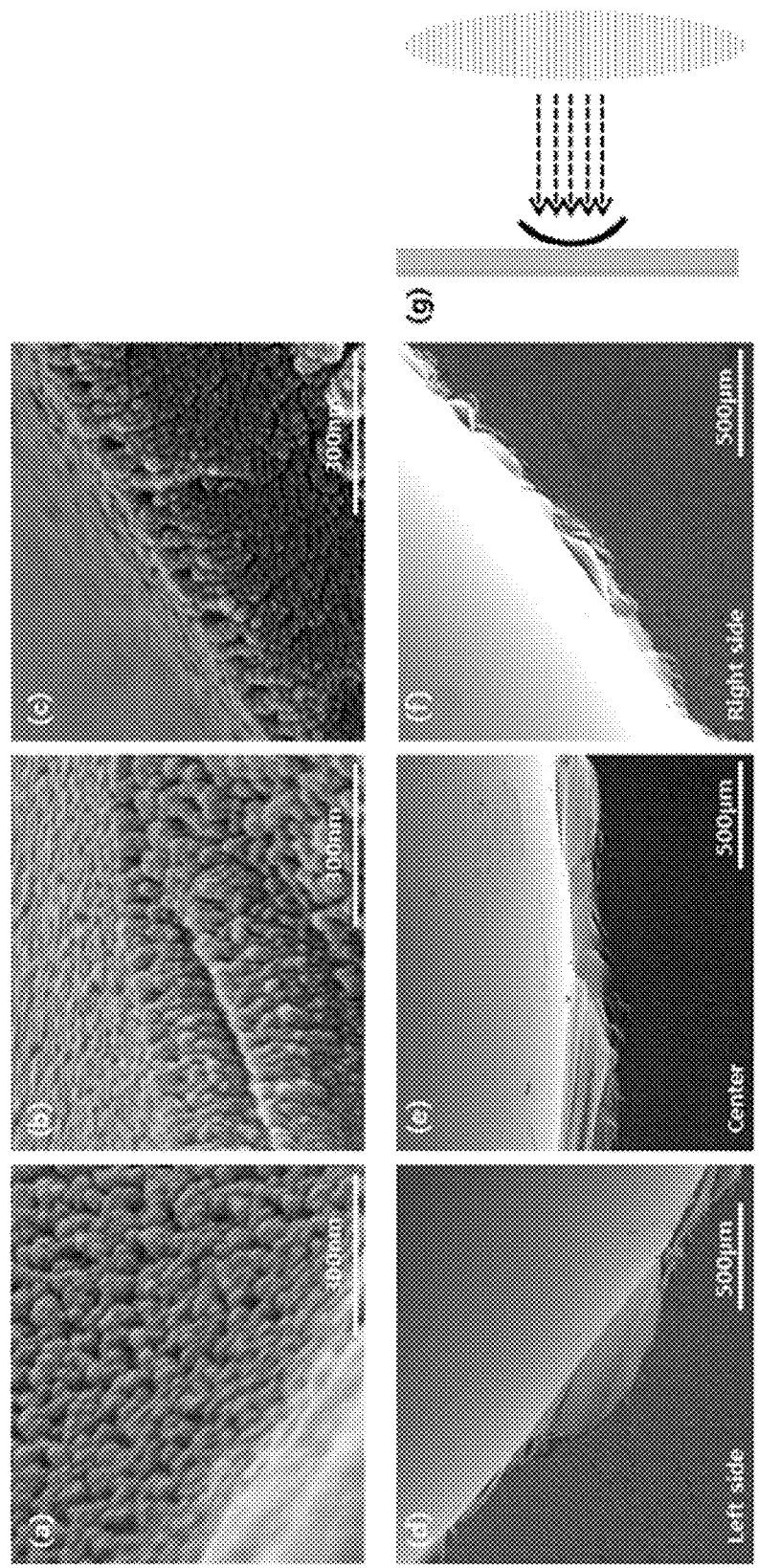
FIG. 11 shows a SEM image of a nano-structure of a $TiO_2$ layer grown on a curved substrate in Example 3, wherein images (d), (e) and (f) respectively show angles of left, central, and right portions of a curved substrate, and images (a), (b) and (c) are of the nano-structure of the $TiO_2$ layer grown on the left, central, and right portions of the curved substrate, respectively.

FIG. 11 shows a SEM image of a nano-structure of a $TiO_2$ layer grown on the curved substrate. In FIG. 11, images (d), (e) and (f) respectively show angles of left, central, and right portions of the curved substrate, and images (a), (b) and (c) are respectively of the nano-structure of the $TiO_2$ layer grown on the left, central, and right portions of the curved substrate.

As shown in FIG. 11, even on a substrate having curvature, $TiO_2$ nanoparticles normal self-align grow to form a nano-structure vertically extending on the substrate.

Example 4

Manufacture of Anti-Reflection Nano-Coating Layer Having Three-Layer Structure on Flat Substrate A flat glass substrate (n=1.52) which had been mounted on a mounting element, and a base pressure of a sputtering apparatus equipped with a silicon sputtering target having a width of 40 cm was lowered to $5\times10^{-6}$ Torr by using a vacuum pump, and then, a ratio of Ar to $O_2$ was adjusted to be 100 sccm:100 sccm to increase a pressure in a chamber up to $10^{-3}$ Torr. At room temperature, a voltage was applied to the silicon sputtering target at electric power of 1.5 kW to generate plasma. A $SiO_2$ layer having a thickness of about 65 nm was deposited on the flat glass substrate.

Then, to deposit a $TiO_2$ layer on the flat glass substrate with the $SiO_2$ layer formed thereon, a base pressure of a sputtering apparatus equipped with a titanium sputtering target having a width of 40 cm was lowered to $5\times10^{-6}$ Torr by using a vacuum pump, and then, a ratio of $Ar:CO:O_2$ was controlled to be from 100 sccm:100 sccm:3 sccm, and the pressure in the chamber was fixed to $3\times10^{-3}$ Torr. A voltage was applied to the titanium sputtering target at an electric power of 1.5 kW to generate plasma. At room temperature, sputtering was performed to deposit a $TiO_2$ layer having a thickness of 100 nm at a deposition angle of 0°.

Thereafter, a base pressure of a sputtering apparatus equipped with a silicon sputtering target having a width of 40 cm was lowered to $5\times10^{-6}$ Torr by using a vacuum pump, and then, a ratio of Ar to $O_2$ was adjusted to be 100 sccm:100 sccm to increase a pressure in the chamber to up to $10^{-3}$ Torr. At room temperature, a voltage was applied to the silicon sputtering target at electric power of 1.5 kW to generate plasma. A $SiO_2$ layer having a thickness of about 15 nm was deposited on the $TiO_2$ layer, thereby completing manufacture of a three-layered nano-coating layer.

Figure 12:
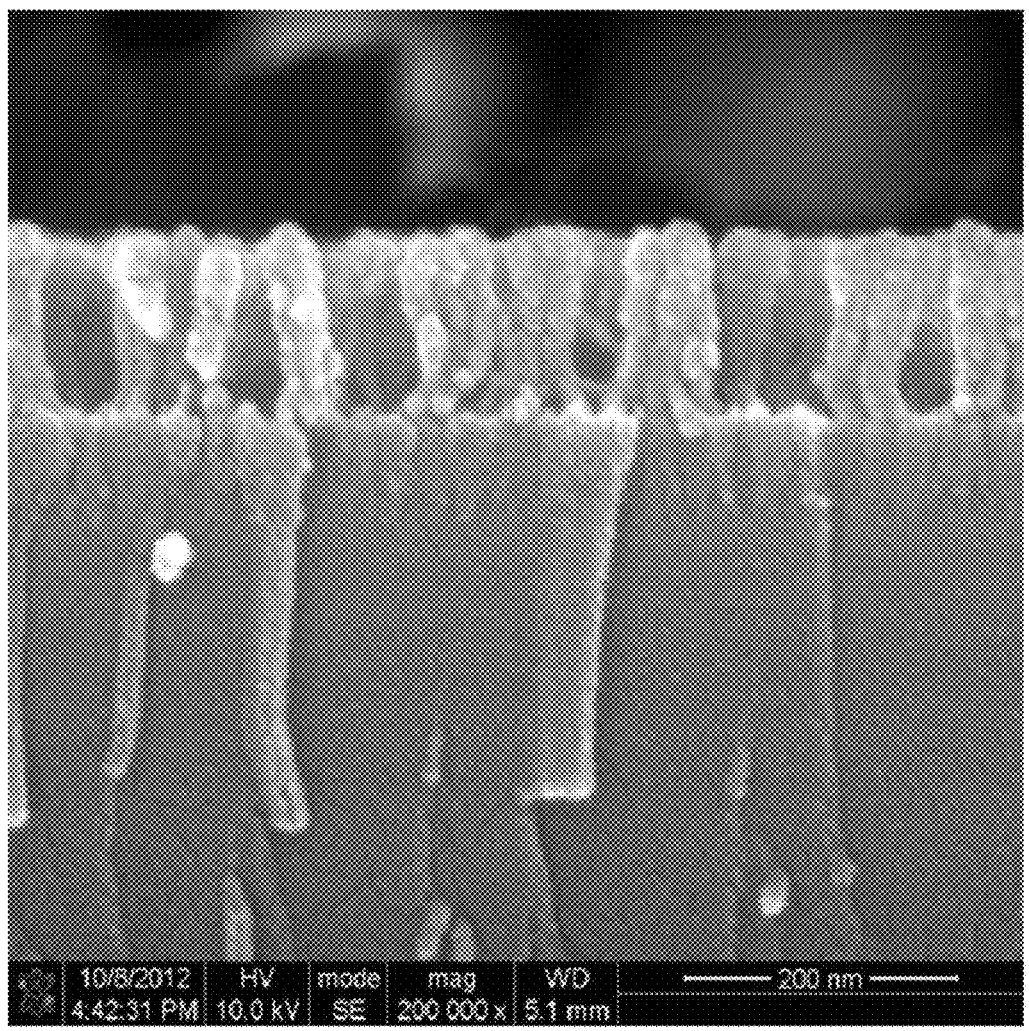
FIG. 12 shows a SEM image of a nano-coating layer prepared according to Example 4.

FIG. 12 shows a SEM image of the nano-coating layer.

Referring to FIG. 12, the $SiO_2$ layer that was first-deposited on the glass substrate consisted of nanoparticles, and the $TiO_2$ layer deposited thereon included a nano-filler that consisted of nanoparticles and normally grew. An upper end of each nano-filler had a diameter of about 50 nm, and a lower end thereof had a diameter of about 40 nm. That is, the lower end of the nano-filler is narrower than the upper end thereof, and accordingly, the $TiO_2$ layer has such a porous structure that an air layer is present between nano-fillers.

Figure 13:
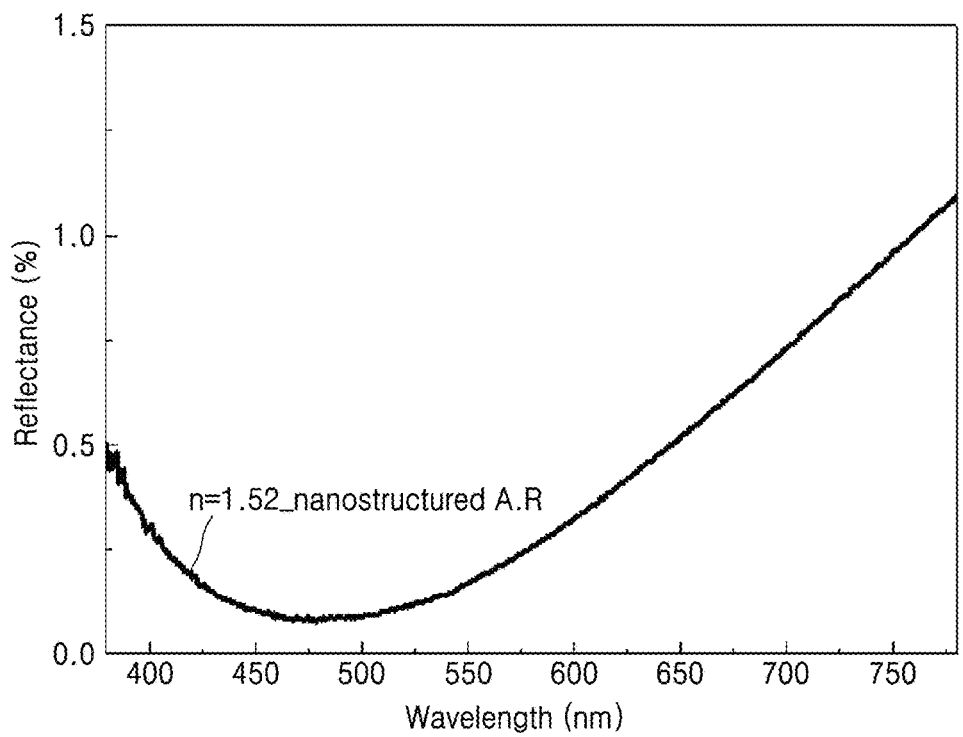
FIG. 13 shows a graph of reflectance of a nano-coated glass substrate prepared according to Example 4, with respect to a wavelength of incident light.

FIG. 13 shows a graph of reflectance of the nano-coated glass substrate, with respect to a wavelength of incident light. An incident angle of light was 0°.

Referring to FIG. 13, it is confirmed that a glass substrate having the nano-coating layer has an average reflectance of 1.0% or less in a visible light range of 380 nm to 780 nm, and an average reflectance of 0.5% or less in a visible light range of 380 nm to 625 nm.

Figure 14:
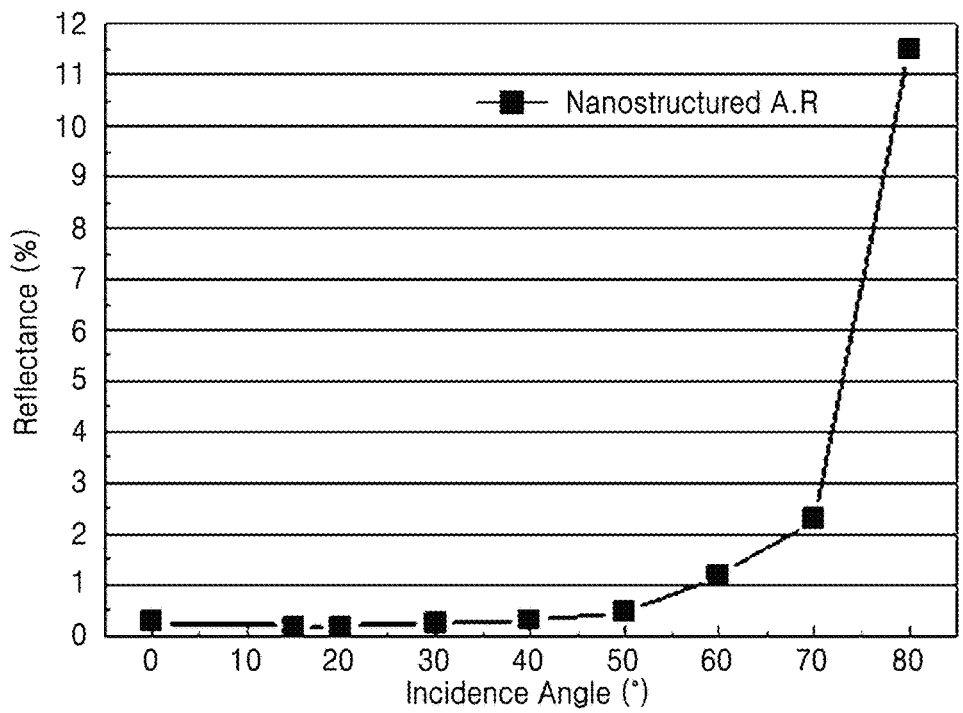
FIG. 14 shows a graph of reflectance of the nano-coated glass substrate prepared according to Example 4 in a wavelength of 380 to 780 nm, with respect to an incident angle of light.

FIG. 14 shows a graph of reflectance of the nano-coated glass substrate in a wavelength of 380 to 780 nm, with respect to an incident angle of light.

Referring to FIG. 14, it is confirmed that the nano-coating layer deposited on a flat glass substrate lacking curvature has an average reflectance of less than 0.8% at an incident angle of 50° or less, and an average reflectance of less than 12% at an incident angle of 80°. That is, even at an incident angle of 60° or more, the nano-coating layer showed anti-reflection characteristics. Accordingly, it is confirmed that even with respect to a substrate having curvature, effective anti-reflection characteristics are obtainable.

Example 5

Manufacture of Anti-Reflection Nano-Coating Layer Having Three-Layered Structure on Curved Substrate An anti-reflection nano-coating layer having a three-layered structure was formed on a concave surface of a camera lens having a diameter of 15 mm and a curvature (R=11.66) in the same manner as in Example 4.

Figure 15:
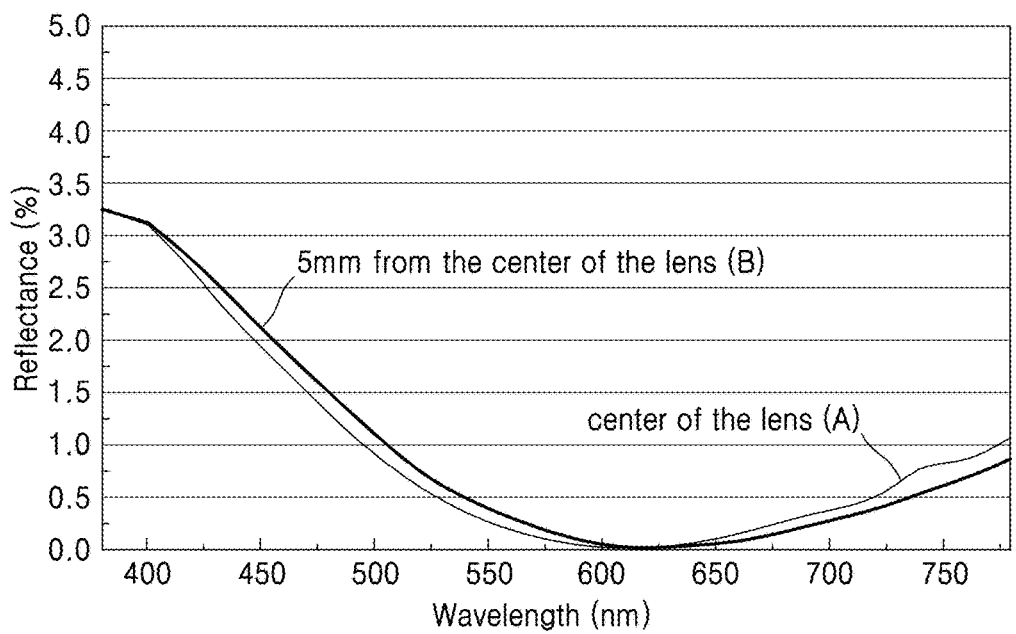
FIG. 15 shows reflectance values of a central portion A and an edge portion B located 5 mm away from a center of a nano-coated lens prepared according to Example 5, with respect to a wavelength of incident light.

A reflectance of a central portion (A) of the camera lens and an edge portion (B) located 5 mm away from a center of the camera lens was measured at various wavelengths of incident light, and results thereof are shown in FIG. 15. An incident angle of light was controlled to be 0° to allow light to vertically progress toward the center of the camera lens.

Referring to FIG. 15, a wavelength corresponding to a minimum reflectance of the central portion (A) and a wavelength corresponding to a minimum reflectance of the edge portion (B) are 600 nm and 620 nm, respectively. That is, the wavelength corresponding to a minimum reflectance of the central portion (A) is similar to the wavelength corresponding to a minimum reflectance of the edge portion (B). This result shows that even on a lens substrate having curvature, a nano-structure is homogeneously grown normally.

Likewise, an anti-reflection nano-coating layer having a three-layered structure was formed on a concave surface of the camera lens having a refractive index (n) of 1.89, and then, fit into a camera, and backlight image was taken by using the camera. The obtained backlight image is shown in FIG. 16.

Figure 2:
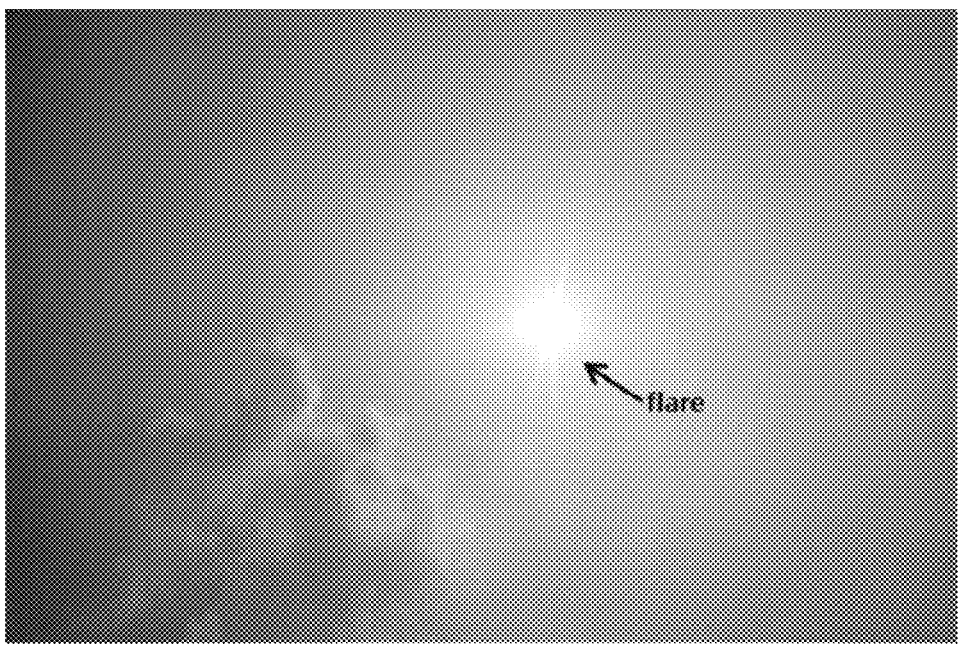
FIG. 2 shows an image obtained by using a commercially available compact digital camera, the image showing a strong flare phenomenon around the sun.
Figure 16:
FIG. 16 shows a backlight image obtained by using a camera assembled with a nano-coated lens having a refractive index (n) of 1.89 prepared according to Example 5 in the open air.

Referring to FIG. 16, it is confirmed that when a camera lens with an anti-reflection nano-coating layer thereon is used, compared to FIGS. 1 and 2, the occurrence of a ghost image or flare phenomenon is substantially reduced.

Example 6

Manufacture of Anti-Reflection Nano-Coating Layer on High Refractive Index Substrate A flat glass substrate having refractive indices (n) 1.79 and 1.89 was subjected to purging with nitrogen ($N_2$) gas by using an atomic layer deposition (ALD) apparatus, and then, an $Al_2O_3$ buffer layer was deposited thereon in conditions including a chamber stage temperature of 110° C., and a unit cycle consisting of an trimethylaluminum (TMA) and $Al(CH_3)_3$) exposure time of 0.1 sec., a nitrogen ($N_2$) purging time of 15 sec., a $H_2O$ purging time of 0.1 sec., and a nitrogen ($N_2$) purging time of 15 sec, wherein this cycle was performed 60 times.

On the $Al_2O_3$ buffer layer, a nano-coating layer having a three-layered structure was deposited on a deposition angle of 0° in the same manner as in Example 4 to obtain an anti-reflection nano-coating layer having a graded structure.

Figure 17:
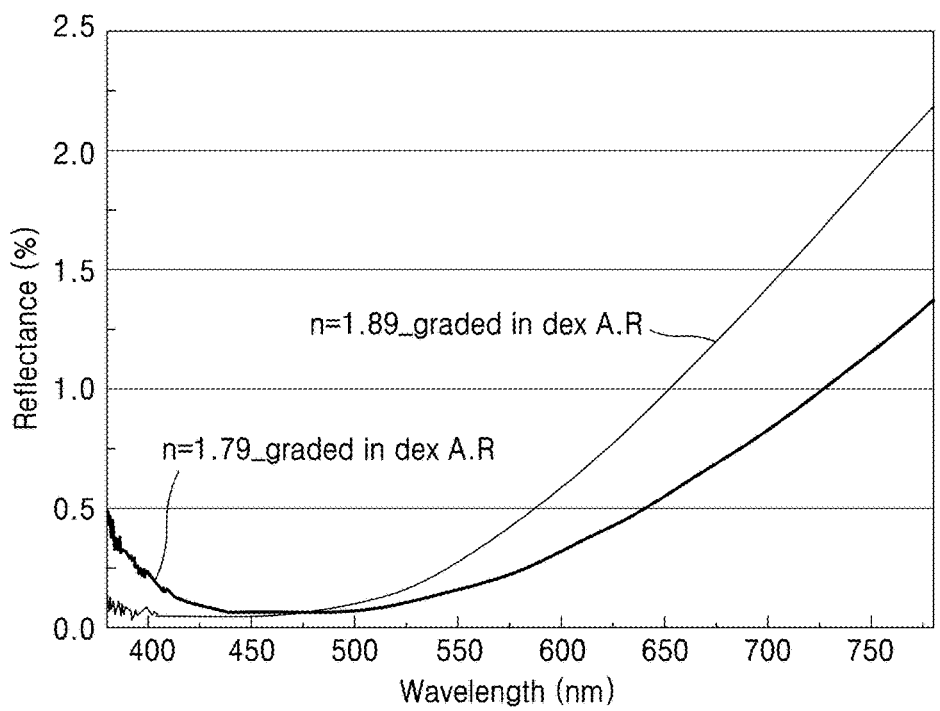
FIG. 17 is a graph of reflectance of a nano-coated glass substrate prepared according to Example 6.

FIG. 17 is a graph of reflectance of the nano-coated glass substrate.

Referring to FIG. 17, it is confirmed that due to the placing of the $Al_2O_3$ buffer layer (n=1.65) having a refractive index that is between the refractive index of the high refractive index substrate and the refractive index of the nano-coating layer having a three-layered structure between the high refractive index substrate and the nano-coating layer having a three-layered structure, anti-reflection characteristics may also be provided to a substrate having a high refractive index.

Figure 18:
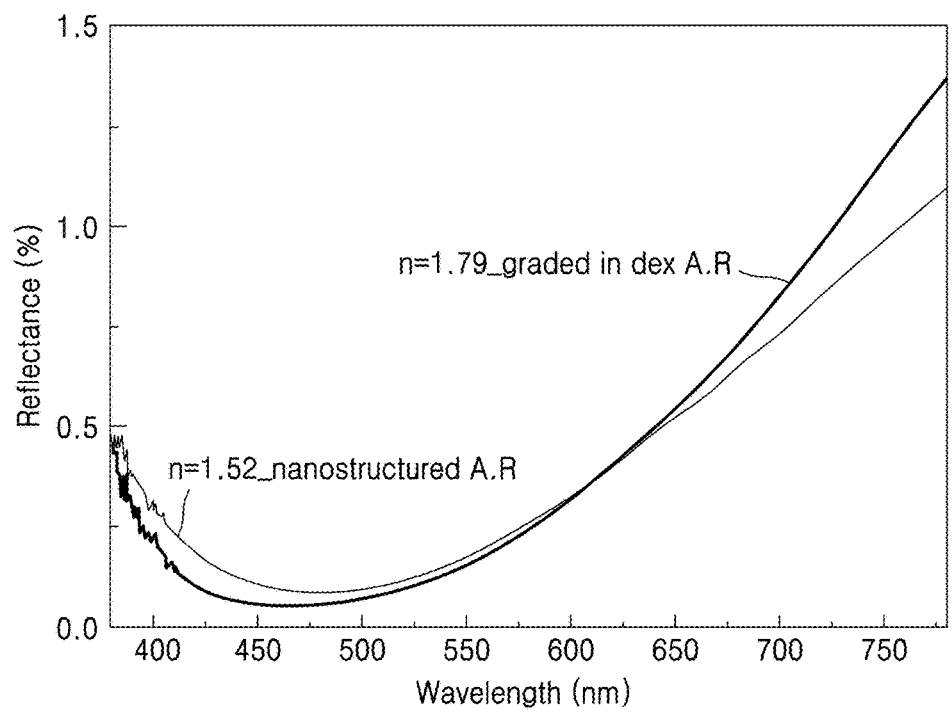
FIG. 18 is a graph to compare anti-reflection characteristics of a nano-coated low refractive index substrate (n=1.52) prepared according to Example 4 and a nano-coated high refractive index substrate (n=1.79) prepared according to Example 5.

FIG. 18 is a graph to compare anti-reflection characteristics of a nano-coated low refractive index substrate (n=1.52) prepared according to Example 4 and a nano-coated high refractive index substrate (n=1.79) prepared according to Example 5.

Referring to FIG. 18, the nano-coated low refractive index substrate of Example 4 and the nano-coated high refractive index substrate of Example 5 commonly had a reflectance of less than 0.5% in a wavelength of 380 nm to 625 nm. Also, in the wavelength of 380 nm to 625 nm, an average reflectance of Example 4 was 0.19% and an average reflectance of Example 5 was 0.16%. In the case of the high refractive index substrate, anti-reflection characteristics may be improved by placing a buffer layer having a refractive index that is between the refractive index of the high refractive index substrate and the refractive index of the nano-coating layer having a three-layered structure.

An anti-reflection nano-coating structure according to an embodiment entirely has a normally aligned nanostructure regardless of curvature of a substrate, and a reflectance characteristic that has a very low dependency on incident angle of light.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An anti-reflection nano-coating structure comprising:
   a substrate that is flat or curved;
   a first coating layer that comprises a first oxide nanoparticle having a refractive index lower than that of the substrate and is disposed on the substrate;
   a second coating layer that comprises tapered nano-fillers including a titanium dioxide nanoparticle and is disposed on the first coating layer, wherein the tapered nano-fillers are aligned normally to the first coating layer; and a third coating layer having a refractive index lower than that of the substrate which comprises a plurality of second oxide nanoparticles, wherein the plurality of second oxide nanoparticles are disposed on an end of each of the tapered nano-fillers, wherein a diameter of each of the tapered nano-fillers decreases towards the first coating layer.

2. The anti-reflection nano-coating structure of claim 1, wherein a radius of a curvature of the substrate satisfies the condition R<50.

3. The anti-reflection nano-coating structure of claim 1, wherein the substrate is a glass substrate, a polymer substrate, a ceramic substrate, or a combination thereof.

4. The anti-reflection nano-coating structure of claim 1, wherein the substrate has a refractive index of 1.4 to 2.0.

5. The anti-reflection nano-coating structure of claim 1, wherein each of the tapered nano-fillers has a height of 50 nm to 200 nm and an average diameter of 10 to 50 nm.

6. The anti-reflection nano-coating structure of claim 1, wherein a void is present between adjacent ones of the tapered nano-fillers, and a refractive index (n) of the second coating layer satisfies the condition 1<n<2.3.

7. The anti-reflection nano-coating structure of claim 1, wherein the first oxide nanoparticle and the plurality of second oxide nanoparticles each independently comprise at least one selected from silicon dioxide, silicon nitride dioxide, and silicon carbide dioxide.

8. The anti-reflection nano-coating structure of claim 1, further comprising a buffer layer between the substrate and the first coating layer.

9. The anti-reflection nano-coating structure of claim 8, wherein the buffer layer comprises aluminum oxide.

10. The anti-reflection nano-coating structure of claim 1, wherein an average reflectance of the anti-reflection nano-coating structure in a wavelength of incident light of 380 to 780 nm at an incident angle of 0° to 50° is less than 0.8%.

11. The anti-reflection nano-coating structure of claim 1, wherein an average reflectance of the anti-reflection nano-coating structure in a wavelength of incident light of 380 to 780 nm at an incident angle of 60° to 80° is less than 12%.

* * * * *